3,039,854
Patented June 19, 1962

3,039,854
PRODUCTION OF PURE PHOSPHORUS
Forrest V. Williams, Dayton, Ohio, assignor to Monsanto Chemical Company, St. Louis, Mo., a corporation of Delaware
No Drawing. Filed June 22, 1959, Ser. No. 821,721
2 Claims. (Cl. 23—223)

The present invention relates to the production of very pure phosphorus suitable for use in the manufacture of electronic and semi-conductor materials such as indium phosphide, gallium phosphide, aluminum phosphide, boron phosphide, zinc phosphide, and mixed metal phosphides.

It is an object of the invention to prepare phosphorus in a form which is relatively free from impurities and which is more uniform in its electrical characteristics as well as in its chemical derivatives than has been possible by prior art methods.

In the production of elemental phosphorus, it has been found that the chemical elements which occur together with the phosphorus are carried into the product. Examples of such impurities include the halogen elements such as fluorine, chlorine, etc., and also sulfur compounds. Certain forms of phosphorus such as the so called white phosphorus which are stored under water or oil may also pick up impurities therefrom.

It has been attempted to purify the elemental phosphorus by distillation, but the conventional distillation processes have been found to offer little improvement in the purity of the phosphorus which is thus obtained.

It has now been found that elemental forms of phosphorus including both the white and red forms may be greatly improved in purity by treatment of the phosphorus at a specific range of elevated temperatures in the presence of hydrogen. In order to carry out such a purification, the phosphorus may be passed directly into a heated conduit made of an inert material such as quartz, while at the same time introducing hydrogen and subjecting the mixture of the phosphorus and hydrogen gases to the said high temperature.

It has been found that a temperature in the range of from 850° C. to 1,000° C. is of utility for this purpose, a preferred range being from 900° C. to 950° C. It is preferred that the treatment with hydrogen be conducted in the substantial absence of any other gases, although an inert gas (e.g., argon, helium or neon) may be present. However reactive gases, such as minor traces of oxygen, must be rigorously excluded from the reaction system. The time during which the phosphorus is in contact with the hydrogen is not critical and may be varied as convenient from a minute or less to an hour or more.

The proportion of hydrogen which is employed in the present treating method is not critical and it has been found that the present process is applicable, both with the use of very small proportions of hydrogen, i.e., 0.01 mole of hydrogen per mole of phosphorus as well as large excesses of hydrogen, e.g., 100 moles of hydrogen per mole of phosphorus are all effective in carrying out the present purification method. The hydrogen used may be of conventional purity, or may be purified by chemical means.

After the phosphorus has been contacted with the hydrogen in vapor phase, such as by passing the gaseous mixture through a packed section of a conduit, e.g., by passage through quartz beads located in a quartz tube at the said elevated temperature, the phosphorus is collected by conventional means. In the method described, using a continuous conduit, the collection zone may be a cooler section of the tubular reactor or a cool condenser. If desired, receiving vessels which may be sealed off may also be employed in this purpose, whereby permitting the phosphorus to be collected in an end tube provided with a gas vent, which may thereafter be sealed off to keep the phosphorus free from contact with air and other impurities until it is desired for further use.

In the manufacture of electronic and semi-conductor components, it has been found that phosphorus compounds must be of an unusually high order of purity in order to function uniformly and effectively in these fields. For example, in the manufacture of indium phosphide, a sample of the purified phosphorus collected in a sealed off tube as described above, may later be connected to a gaseous reaction system. The phosphorus is then heated in its tube in order to volatilize the said phosphorus into a further tubular section in which elemental indium is located. The phosphorus then reacts with the indium to give the desired indium phosphide. By such methods, other semi-conductor components, such as gallium phosphide, aluminum phosphide, boron phosphide, and zinc phosphide, may also be prepared. Mixed metal phosphides such as zinc germanium phosphide, $ZnGeP_2$, are also readily prepared from the instant purified form of elemental phosphorus prepared in accordance with the method of the present invention.

The apparatus employed in carrying out the present invention may also be modified to use vertical tubes for example, in which phosphorus is volatilized from either the white or red form maintained in a storage receptacle, directly into a tubular section where it is contacted with hydrogen at the aforesaid higher temperature, and then condensed in a suitable vessel. However, it has been found that the temperature range of from 850 to 1000° C. is critical in this relationship, and that the use of the lower temperature such as 700° C. does not effect any purification. It has also been found that the mere sublimation of elemental phosphorus in either dry air or a vacuum, for example, at 450° which is a conventional sublimation temperature, does not accomplish the purification which is achieved by the practice of the present invention.

The following examples illustrate specific embodiments of the present invention.

*Example 1*

The purification of red phosphorus was carried out by placing a quartz boat of phosphorus in a quartz tube of one inch diameter and 24 inch length. The quartz tube was provided with two independent heating jackets as well as a third cooling section located in the atmosphere. At the inlet end of the tube, a connection was provided for the introduction of gaseous hydrogen in the tube, while at the exit end a vacuum connection was provided as well as a previously prepared seal-off section for the collection of the purified phosphorus in a sealed-off quartz tube. The first furnace which was placed around the boat containing the red phosphorus was heated to a tempearture of 450° C. while the middle reactor section which was packed with quartz beads located in the quartz tube, was maintained at a temperature of 925° C. The third section was at substantially atmospheric temperature. A stream of hydrogen at the rate of 100 cc. per minute was introduced into the tube, thereby volatilizing phosphorus from the supply of 18.61 grams of red phosphorus. This gaseous mixture of hydrogen and phosphorus, in the substantial absence of any other gases was then passed into the reactor section. The gaseous mixture after the purification reaction had been completed, passed to the condenser section where the phosphorus condensed on the walls of the quartz receiving tube, while the hydrogen was withdrawn from the system. The pressure in the reaction system was maintained at 760 mm. Hg. After the above process had been conducted for a period of 2 hours, the receiving tube was sealed off, subjected to vacuum and the vacuum connection sealed off to yield the purified phosphorus in an evacuated tube for storage until needed for subsequent processing.

In another test carried out as described above, the system after 2 hours of reaction was swept with elemental argon and was then sealed off while under atmospheric pressure.

*Example 2*

A similar test as described above but with the use of white phosphorus was also found to give a purified product as summarized in the table below.

The gerat purity of the phosphorus produced in accordance with the method of the present invention is difficult to analyze by conventional chemical methods, and it was therefore found that an adequate indication of purity could only be obtained by utilizing the purified phosphorus for reaction with indium in order to make indium phosphide, and then to determine the electronic properties of such indium phosphide. The indium phosphide thus prepared by volatilizing the phosphorus into a body of metallic indium, employing a temperature of 450° C. to volatilize the phosphorus, and a temperature of 1060° C. to effect the reaction of the indium and the phosphide, gave a crystalline form of indium phosphide. This product was subjected to measurement of the electrical properties to determine the concentration of impurities expressed as atoms of impurities per cc. of indium phosphide.

Control tests were also performed in which C.P. phosphorus samples, both red and white were transformed into indium phosphide without any hydrogen treatment. These samples were also used for electrical testing.

*Example 3*

In order to study temperature effects, the procedure of Example 1 was followed in three tests carried out at 900° C., 715–735° C., and 1,000° C. The treated phosphorus was then transformed into indium phosphide, and the electrical properties were measured.

The indium phosphide described above for the respective examples was also measured to determine the mobility of the product as an indication of the purity of the elemental phosphorus which went into the making of such indium phosphide.

*Example 4*

The use of specially purified hydrogen is shown in this example.

The method of Example 1 was employed, but the hydrogen stream was passed over metallic titanium at 840° C. followed by passage thru a cold trap containing activated charcoal held at the temperature of liquid nitrogen.

The electrical properties (impurity concentration as atoms/cc.) for the various test samples of the above examples are summarized below:

| Example | Reagent | Conditions | Impurity Conc. atoms/cc. |
|---|---|---|---|
| 1 | Red P | 925° C.+$H_2$ | $1.16 \times 10^{16}$ |
| 2 | do | Untreated (No $H_2$) | $5.6 \times 10^{17}$ |
| 2 | White P | Untreated (No $H_2$) | $5.5 \times 10^{17}$ |
| 2 | do | 905° C.+$H_2$ | $1.4 \times 10^{16}$ |
| 3 | Red P | 900° C.+$H_2$ | $1.4 \times 10^{16}$ |
| 3 | do | 715–735° C.+$H_2$ | $3.5 \times 10^{17}$ |
| 3 | do | 1,000° C.+$H_2$ | $1.7 \times 10^{16}$ |
| 4 | do | 900° C. (Purified $H_2$) | $8.2 \times 10^{15}$ |

The above data show that a major improvement, e.g., by a factor of as much as 70 in the purity of the phosphorus results from the hydrogen purification method of the present invention.

What is claimed is:

1. Process for the purification of elemental phosphorus including at least one of the impurities of the group of fluorine, chlorine and sulfur compounds which comprises volatilizing the phosphorus to the gas phase, and contacting the same with gaseous hydrogen in the substantial absence of other gases, at a temperature in the range of from 850° C. to 1,000° C., and thereafter cooling the said gaseous mixture to condense the purified phosphorus.

2. Process for the purification of elemental phosphorus including at least one of the impurities of the group of fluorine, chlorine and sulfur compounds which comprises volatilizing the phosphorus to the gas phase, and contacting the same with gaseous hydrogen in the substantial absence of other gases at a temperature in the range of from 900° C. to 950° C., and thereafter cooling the said gaseous mixture to condense the purified phosphorus.

References Cited in the file of this patent

FOREIGN PATENTS 378,226    Great Britain _____ Aug. 11, 1932

OTHER REFERENCES

Mellor: "A Comprehensive Treatise on Inorganic and Theoretical Chemistry," vol. 8 (1928), p. 743, Longmans, Green & Co.

Roscoe and Schorlemmer: "A Treatise on Chemistry," vol. 1, 1905 ed., page 606, MacMillan and Co., Ltd., London.